Inventors,
Chester M. Wiig, &
Earl L. Valjin.
By Hume Groen Clement & Hume
Attys

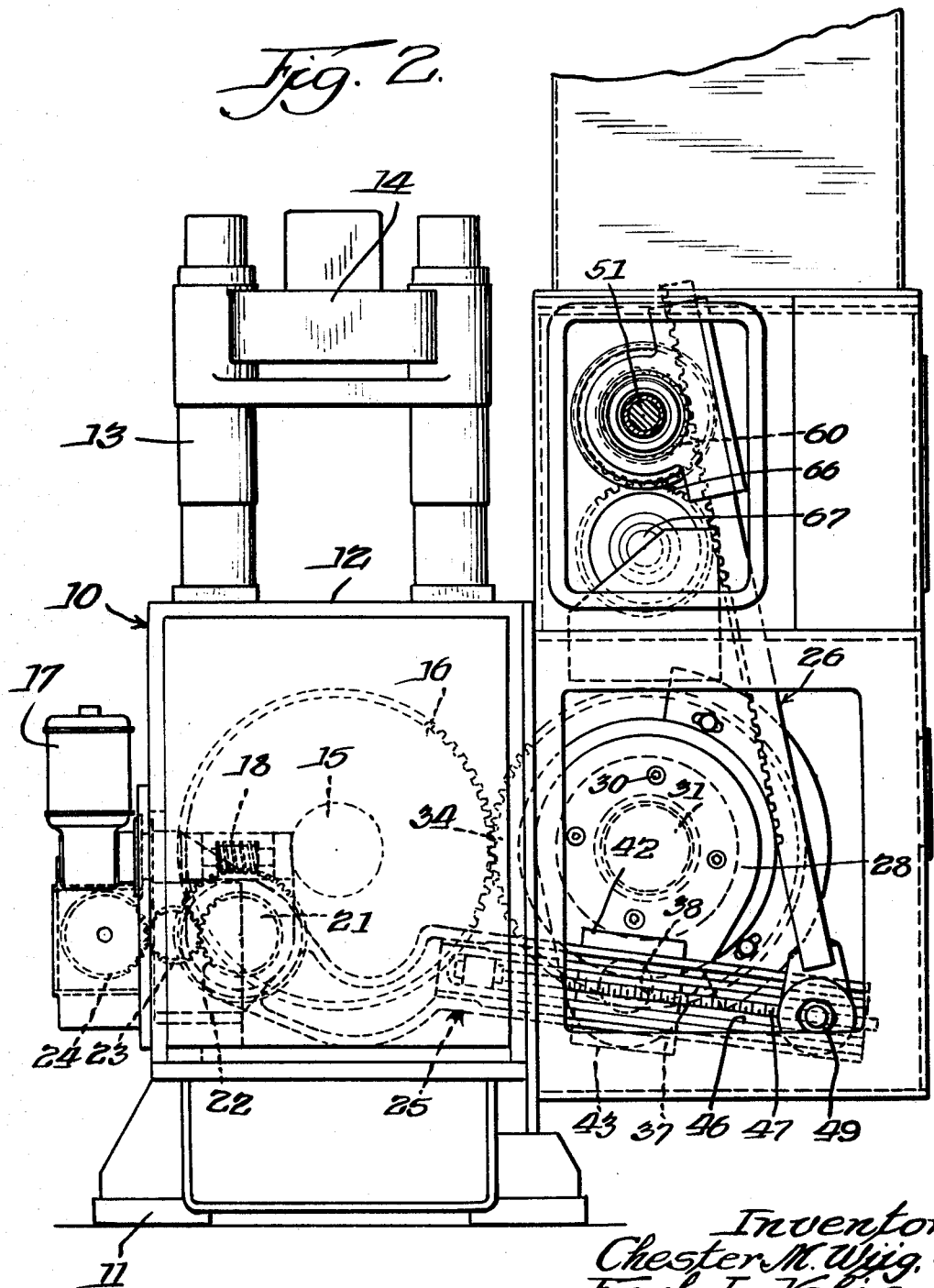

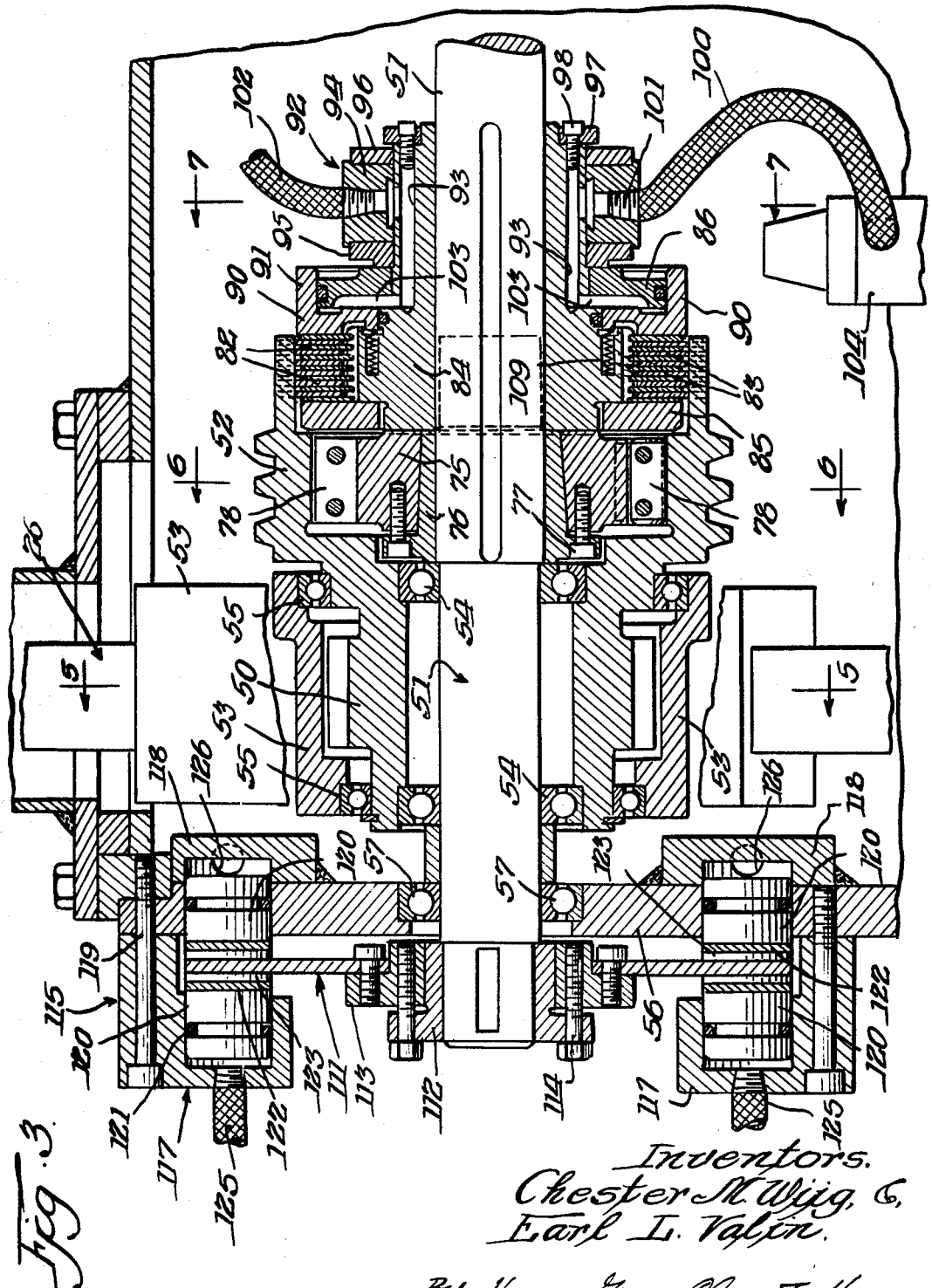

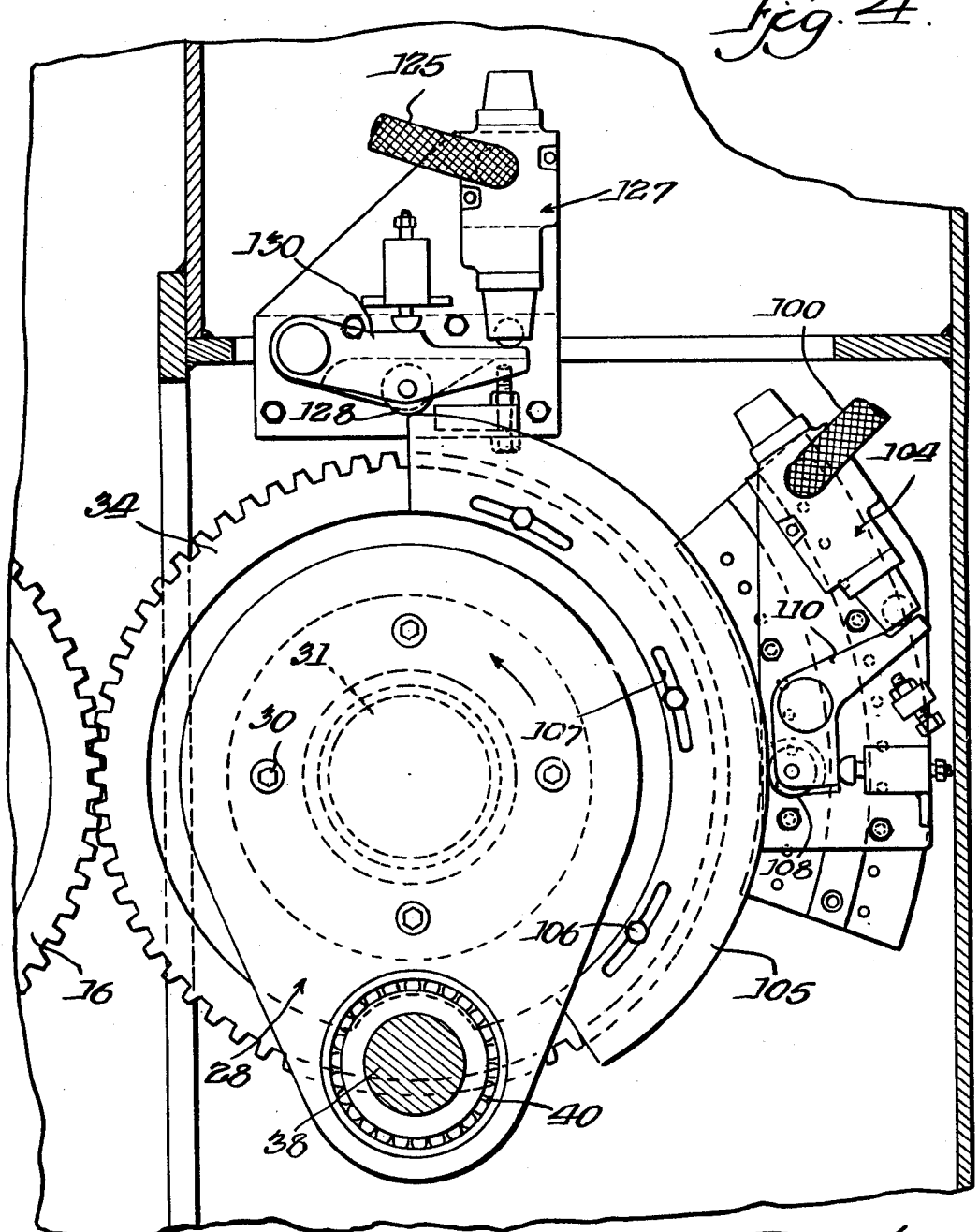

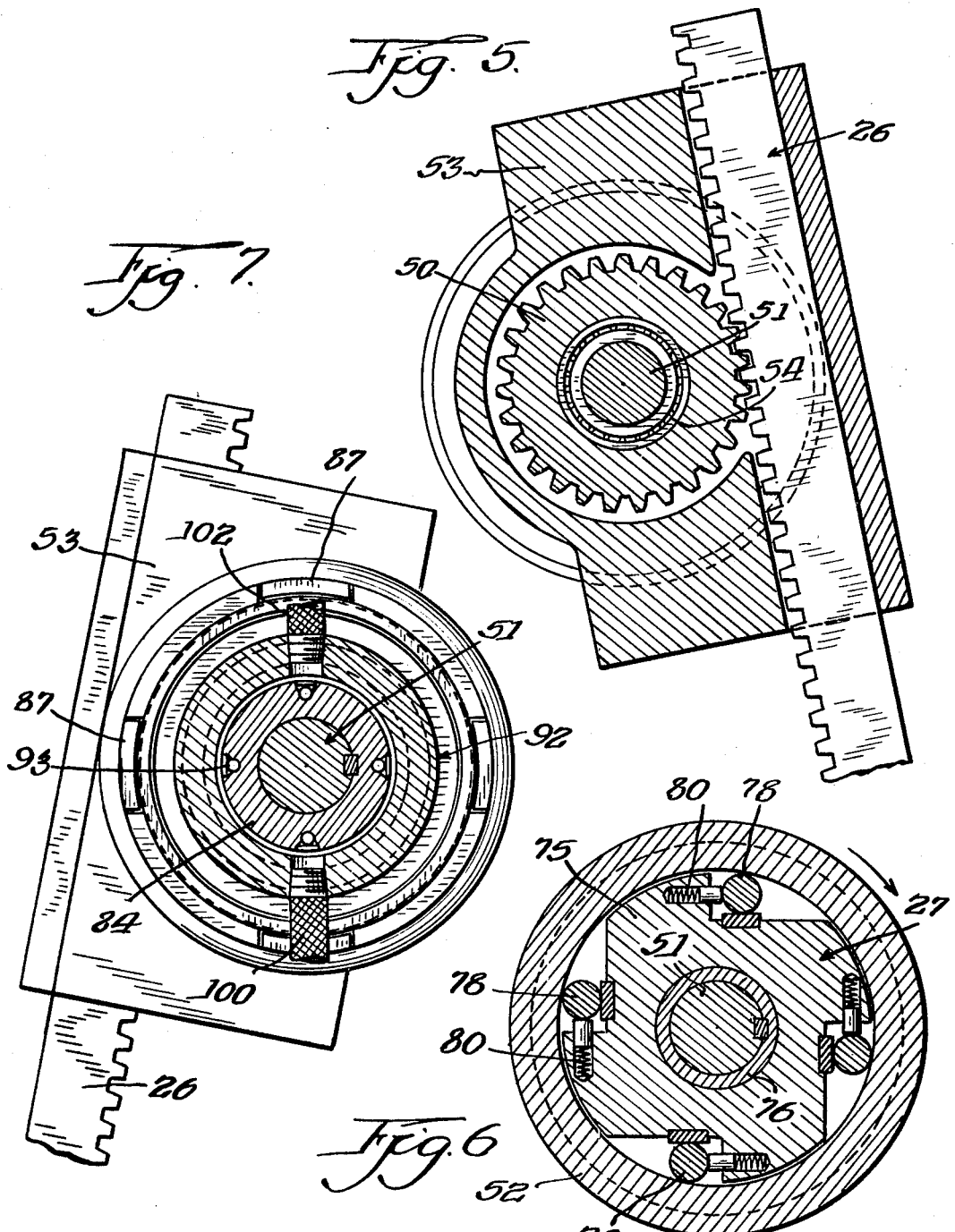

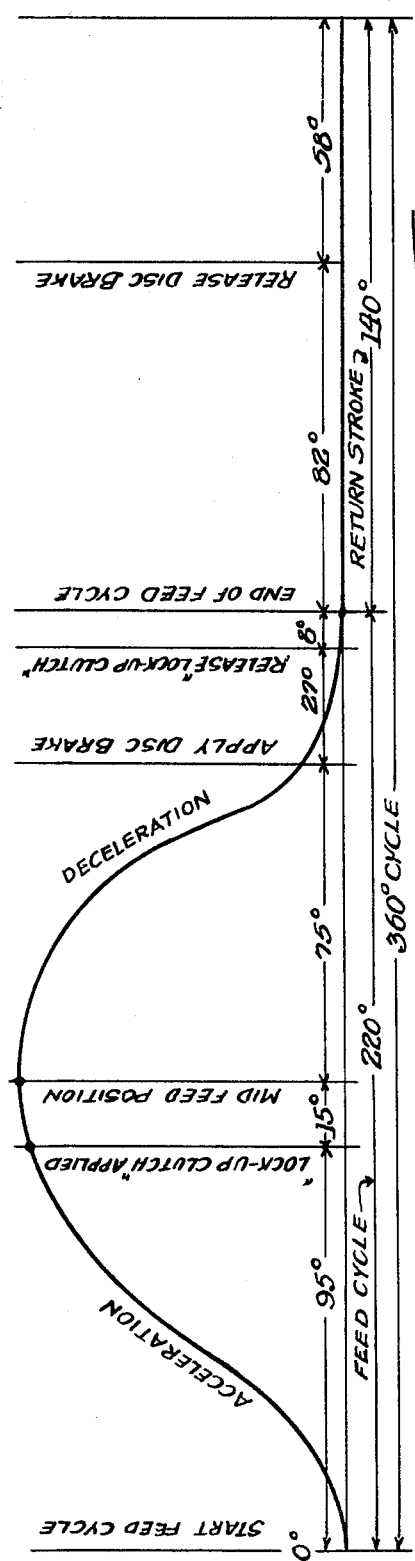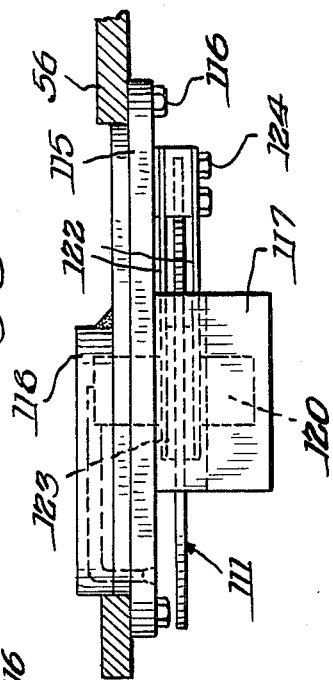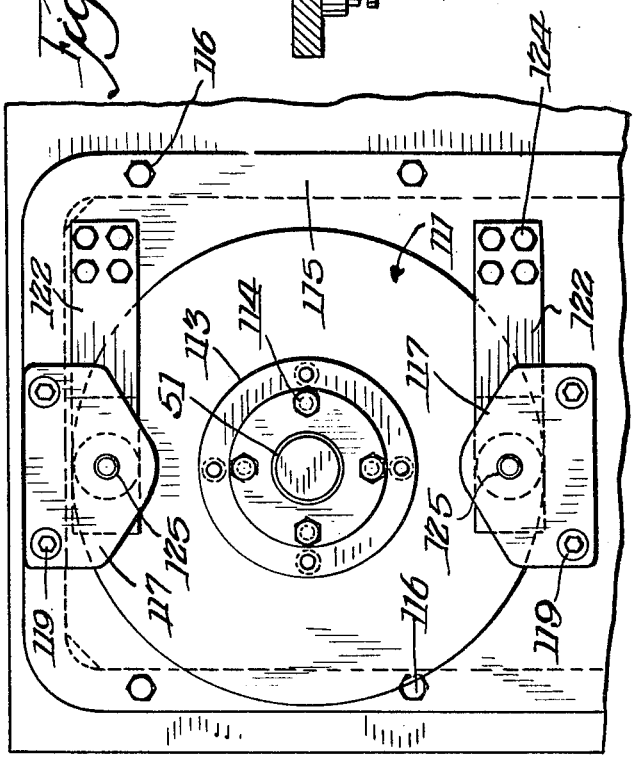

United States Patent Office 3,393,778
Patented July 23, 1968

3,393,778
FRICTIONALLY LOCKED-UP FEED DRIVE
Chester M. Wiig, Lincolnwood, and Earl L. Valin, Chicago, Ill., assignors to F. J. Littell Machine Co., Chicago, Ill., a corporation of Illinois
Filed Aug. 22, 1966, Ser. No. 574,155
4 Claims. (Cl. 192—12)

ABSTRACT OF THE DISCLOSURE

The lock-up mechanism of the invention has been designed for the over-running clutch of intermittent strip feeding mechanism. Friction discs are carried by the hub part of the clutch and similar friction discs are carried by the annular enclosing housing. A pressure plate is adapted to effect a lock-up of the friction discs and said pressure plate is actuated by pneumatic means including a cam actuated air valve. A friction brake is carried by the shaft of the clutch to which the driven hub part is keyed and friction means are provided for the brake which are cam actuated by the same cam as is provided for the said air valve.

---

The invention relates to mechanism for feeding strip material to a punch press or the like and has reference, more particularly, to improved brake means and lock-up mechanism in combination with means for intermittently driving the feed rolls including reciprocating rack structure with an overrunning clutch.

In the feeding of metal strip material for cutting, punching and for similar operations it is conventional procedure to employ coacting feed rolls and which are actuated intermittently from a main drive shaft through a one-way clutch of the overrunning type. The feed rolls are accelerated from an idle position to maximum speed during each operative stroke of the reciprocating rack, and said rolls remain at rest during the return or inoperative stroke of the reciprocating rack.

An object of the present invention is to provide a friction brake and lock-up mechanism for the overruning drive of strip feeding mechanism such as described and which will releasably lock up the driving and driven members of the clutch so as to prevent overrunning during the decelerating portion of the cycle.

Another object of the invention is to provide a friction brake and lock-up mechanism for an overrunning drive wherein the lock-up mechanism consists of friction discs which are rendered operative by pneumatic means to effect a locked up relation and wherein the brake is also of the friction type having pneumatic means controlled by an air valve for rendering the brake operative.

Another object resides in the provision of lock-up mechanism for an overrunning drive in combination with a controlled friction brake and wherein both the lock-up mechanism and the friction brake are pneumatically actuated into operative positions and which take place automatically during each cycle, being in turn controlled, respectively, by a cam actuated air valve.

A further object is to provide a unitary overrunning clutch and pneumatic lock-up mechanism wherein the said lock-up mechanism includes a plurality of friction discs carried by the driving member and which alternate with friction discs carried by the driven member of the overrunning clutch.

Another object is to provide a friction brake having pneumatically actuated pistons for regulating the braking action and wherein the pistons are carried by flat spring members so as to obtain the most efficient and the most satisfactory operation of the brake.

With these and various other objects in view the invention may consist of certain novel features of construction and operation as will be more fully described and particularly pointed out in the specification, drawings and claims appended thereto.

In the drawings which illustrate an embodiment of the device and wherein like reference characters are used to designate like parts:

FIGURE 2 is a front elevational view of the apparatus shown in FIGURE 1 with parts in section, the view illustrating the driving connection between a punch press and reciprocating rack structure for an overrunning clutch which in turn drives the feed roll;

FIGURE 3 is an enlarged sectional view taken longitudinally of the top drive roll shaft and which shows the overrunning clutch structure, the lock-up mechanism and the friction brake;

FIGURE 4 is an elevational view taken substantially on line 4—4 of FIGURE 1 and which shows the air valves and adjustable cam plate for actuating the same;

FIGURE 5 is a sectional view of the rack and clutch connection taken substantially along line 5—5 of FIGURE 3;

FIGURE 6 is a sectional view of the overrunning clutch taken substantially along line 6—6 of FIGURE 3;

FIGURE 7 is a sectional view taken substantially along line 7—7 of FIGURE 3;

FIGURE 8 is a fragmentary front elevational view showing the structural details of the friction brake means;

FIGURE 9 is a sectional view showing the details of one of the pneumatically actuated piston members; and FIGURE 10 is a view of a graph which illustrates the operations of the lock-up mechanism and friction brake means for one cycle of the feeding apparatus.

Figure 1:
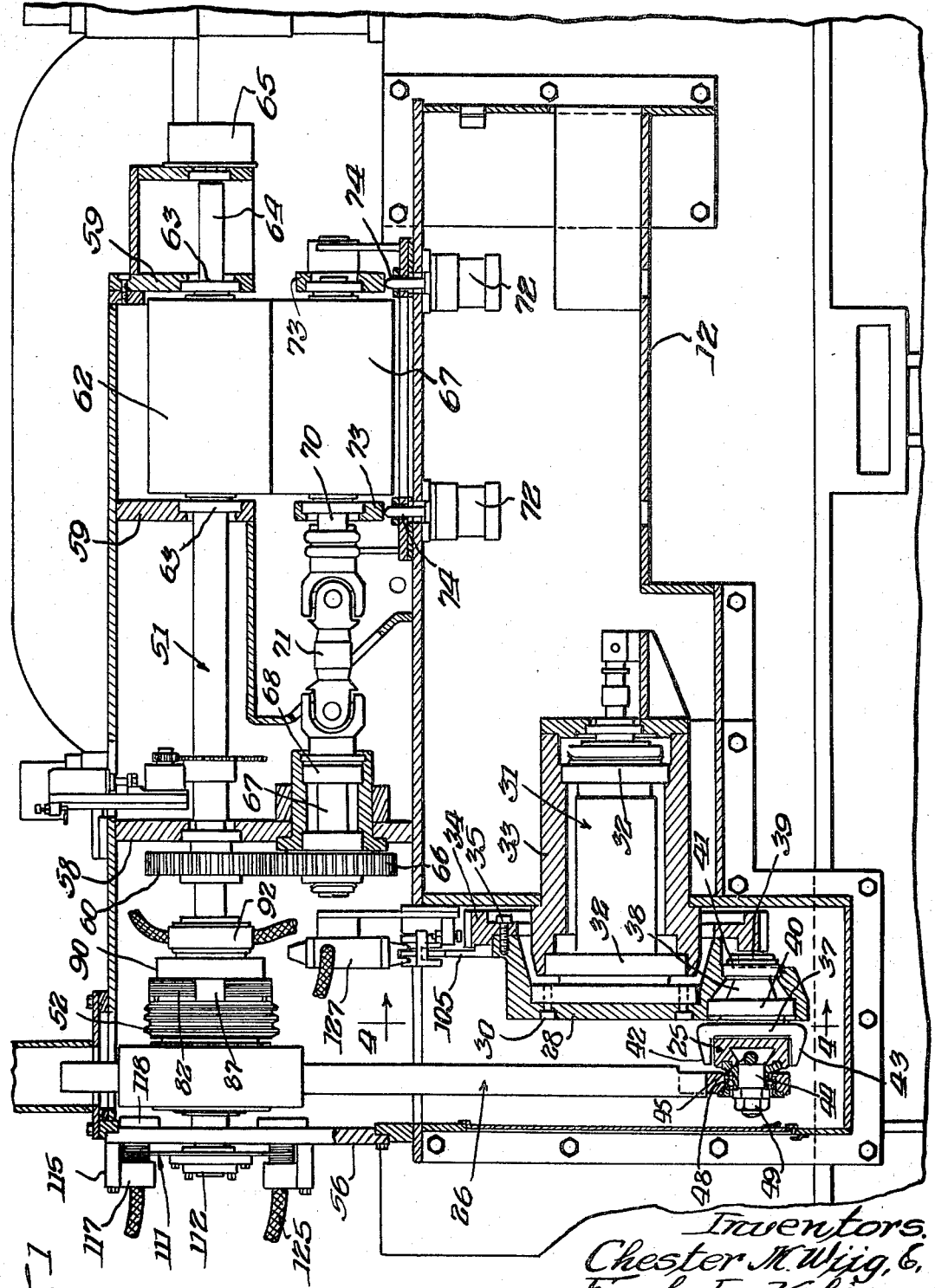
FIGURE 1 is a vertical sectional view taken longitudinally through apparatus for intermittently feeding strip material and which incorporates the improved lock-up mechanism and friction brake means of the invention.

The intermittent feeding apparatus for strip material which has been selected for illustrating the invention has been shown as applied to a sharing press 10, FIGURE 2, having the supporting base 11, the housing 12 and the conventional upper and lower cutting knives, not shown. The reciprocating structures 13 and 14 reciprocate the movable upper knife with respect to the stationary lower knife, and the strip material to be cut into desired lengths is fed to the cutting knives during the period in the cycle when the knives are separated. During the cutting operation the feed rolls and the strip material remain at rest.

The numeral 15 indicates the main drive shaft of the shearing press and the gear 16 is suitably fixed thereto. The motor 17 is supported on the housing 12 and the drive shaft of the motor includes the worm gear 18 which is in mesh with the gear 20 on the eccentric shaft 21. The meshing gears 22, 23 and 24 drive an indicator so that the operator may be informed as to the position of the eccentric shaft 21. This is desirable as the shaft provides a journal for the oscillating arm indicated in its entirety by the numeral 25. The arm 25 is oscillated in timed relation to the cutting operations of the shearing press and said oscillations are transmitted to the rack 26 which drives an overrunning clutch 27, FIGURE 6, to be presently described in detail. The oscillating arm structure is essentially the same type as shown in the Budlong Patent 3,089,345 granted May 14, 1963. The driving disc 28 is suitably secured by the screws 30 to the auxiliary shaft 31, FIGURE 1, which is journalled by the bearings 32 in the housing member 33. The gear 34 is fixed to the disc 28 by the securing screws 35 and the gear has meshing relation with gear 16, a 1-to-1 ratio, whereby the driving disc 28 is driven at the same speed as the main shaft 15 of the press.

The crank structure for oscillating the arm 25 has such operative connection with the arm and its direction of rotation is such as to effect an operative feeding stroke of the reciprocating rack 26 for approximately 220 degrees of rotation and an inoperative stroke for the remainder of the cycle or for approximately 140 degrees of rotation. Thus, the feed rolls are driven relatively slow in a feeding direction to achieve maximum accuracy in the feed and which is followed by a quick return. The connection between the driving disc 28 and the arm 25 consists of a yoke 37 which provides the journalling portion 38 integral therewith and which includes the threaded end 39. The portion 38 has several bearing surfaces which receive the bearing assemblies 40 and 41. The assemblies, in turn, have an inserted relation in the driving disc. The yoke 37 includes a top arm portion 42 and a bottom arm portion 43. The portions having sliding contact with the top and bottom surfaces of the oscillating arm as clearly shown in FIGURE 1.

The pivot connection for the rack 26 is formed by the member 44 which has a base 45 of dovetail shape similar to the groove 46 formed in the arm. The base has location within the arm and the member 44 is threadedly connected to the adjusting rod 47, FIGURE 2, which is journalled by and extends longitudinally of the oscillating arm. When the adjusting rod is rotated, the pivot connection for the rack is adjustably positioned along the length of the oscillating arm whereby the stroke of the rack can be varied in magnitude. For micro adjustments in the feeding lengths of the strip material the eccentric shaft 21 is rotated by operation of the motor 17. This varies the pivot axis of the oscillating arm and said micro adjustments can be made during operation.

The pivot end of the member 44 extends outwardly of the oscillating arm and said end carries a ball bearing assembly 48 and a nut 49. In advance of operating the machine it is necessary to position the pivot connection 44 longitudinally of the oscillating arm 25 so that the reciprocating rack 26 will produce the desired feeding lengths. The nut 49 is first loosened in order to free the pivot connection and the adjusting rod is then rotated, which will effect movement of the pivot connection in either direction. When the desired location for the pivot connection has been obtained the screw 49 is tightened again to lock the connection of the rack to the oscillating arm.

Upon rotation of the drive shaft 15, the crank arm structure including the yoke 37 will produce oscillating movement of the arm 25 and wherein the same will have an operative stroke in a downward direction for the major portion of the cycle followed by a quick return up stroke for a minor portion of the cycle. The rack 26 which is reciprocated by the arm 25 has meshing relation with the pinion 50, FIGURE 5, which is integral with the drive housing 52. As best shown in FIGURE 3, the said pinion and housing as a unit is journalled for rotation on the upper feed roll drive shaft 51. The rack reciprocates within the gear housing 53 and which also encloses the pinion so that the gear housing will rock with respect to the shaft 51 as the rack reciprocates.

The pinion 50 and the integral drive housing 52 are mounted for rotation on the shaft 51 by the bearings 54. The gear housing 53 is, in turn, mounted for rotation on the hub of the pinion 50 by the bearings 55. The shaft 51 is supported at its left hand end by the side wall 56 of the frame structure, the bearing 57 journalling the shaft for rotation. The right hand end of shaft 51 extends through the partition walls 58, FIGURE 1, and through the spaced partition walls 59. Adjacent the partition wall 58, the gear 60 is fixed to the shaft, and between the spaced partition walls 59 the upper feed roll 62 is fixed to the shaft. The numeral 63 indicates bearings for the shaft at the partition walls 59 and the extension 64 drives an electron pulse generator 65 for signalling the positions of the feed roll and which are corelated with other signals from a pin hole detector.

The gear 60 meshes with a similar gear 66 which drives the lower feed roll 67 disposed below and in contact with the upper feed roll 62. The gear 66 is fixed to shaft 67 which is journalled by the bearings 68 and which is mechanically connected to the shaft 70 by the universal joint 71. The members 72 support the bearing assemblies 73 for shaft 70, the members having the piston actuated pins 74 for this purpose. When the pins are lowered, the lower feed roll is separated from the upper feed roll to permit the insertion of the strip material between the rolls. The bodily movement of the lower feed roll is made possible by the universal joint 71.

Referring to FIGURE 3 it will be seen that the drive housing 52 provides the outer circular casing for the overrunning clutch 27, FIGURE 6. The inner hub of the clutch is indicated by the numeral 75 and said hub is mounted on the taper lock 76, being secured by the screws 77. The taper lock is, in turn, keyed in position on the shaft 51. Hub 75 is cut away at a number of spaced locations on its periphery for receiving the clutch rollers 78 which are backed by the coil springs 80. The casing 52 comprises the driving member of the clutch and the hub 75 and shaft 51 comprise the driven member. Thus when the casing is rotated in a clockwise direction by a down stroke of the rack it is operative to drive the hub and shaft also in a clockwise direction. On the upward return stroke of the rack, the casing reverses its direction of rotation but the hub and shaft remain stationary and the feed rolls are accordingly rotated intermittently.

Since the structure incorporates an overrunning clutch the invention provides lock-up means for the same in order that control of the feed rolls can be maintained for substantially the entire length of the operating stroke. As a result, the strip material can be fed to an accuracy within one or two thousandths of an inch and at speeds materially in excess of the feeding speeds heretofore employed.

In actual operation the lock-up mechanism of the invention is rendered operative during the accelerating portion of the feeding stroke so that the driving and driven members of the clutch will be definitely locked together at the beginning of the decelerating portion of said stroke. The members remain locked up almost to the end of the feeding stroke, although the actual point of release is not critical and will depend on the inertia of the rotating parts. The greater the inertia, the longer the members of the clutch should remain locked. In other words, the release of the lock-up means may be delayed until a few degrees before the end of the decelerating portion of the feeding stroke. This is certainly the case in those installations where the inertia is excessive due to the mass of the rotating parts, or due to high speeds and where the accuracy of the feed lengths must be maintained within a few thousandths of an inch.

The lock-up mechanism essentially consists of alternating friction discs and pneumatic means for rendering the lock-up structure operative. One set of the discs indicated by the numeral 82 is fixed to and carried by the drive housing 52. The other set 83, and which alternate with 82, are fixed to and carried by the lock-up hub 84 which is keyed to the shaft 51. The disc arrangement is backed at the left hand end of the structure by the backing plate 85, and at the right hand end the backing plate 86 is provided. The backing plate 85 is joined to the lock-up hub 84 so that the parts are unitary, and it will be observed that the drive housing has projections 87, FIGURE 7, which fit in slots in the discs to lock the discs to the housing. The discs 83 are locked to the hub 84 in a similar manner and thus the discs are loose so that movement axially of the shaft 51 is possible. The pressure plate 90 is carried by the hub 84 being slidably mounted thereon and sealed by one or more O-ring devices. The pressure plate has a circular flange 91 extending to the right and which receives the backing plate 86. Here again, the parts are sealed by one or more O-ring devices and the backing plate 86 is mounted on the lock-up hub so as to have a sealing fit. The pressure plate 90 may rotate at times with the drive housing. However, the backing plate 86 will remain stationary except when the shaft 51 is rotating.

When the pressure plate 90 is moved to the left it applies pressure on the alternating disc structure and as a result of this pressure the hub 84 which carries the discs 83 will be locked to the drive housing 52 which carries the discs 82. Overrunning of the shaft 51 and the feed rolls on the decelerating portion of the feeding stroke of the rack can thus be prevented.

In accordance with the invention the lock-up structure is made operative by pneumatic means, that is, by the application of air under pressure to the right hand face of the pressure plate 90. This causes the friction discs to contact adjacent discs and lock the feed roll drive shaft 51 to the housing 52 and thus to the reciprocating rack 26. A collar 92 is provided for conducting the air to the circular passage 93 which is formed in the lock-up hub. The collar is mounted on the hub so as to remain stationary, although permitting rotation of the hub and feed roll shaft. The collar may be formed of several parts suitably welded or otherwise joined together such as the ring 94 and the side members 95 and 96. The end washer 97 which closes the circular passage 93 is fixed to the hub by the securing screws 98 and the end washer thus rotates with the hub. Compressed air is conducted to the passage 93 by the flexible conduit 100 which is connected at 101 to the ring 94. The flexible conduit 102 also having connection with the ring functions as an exhaust for the air. Both conduits communicate with the passage 93 and which in turn has connecting relation with the passage 103 located between the pressure plate 90 and the right hand backing plate 86.

The air valve 104, FIGURES 3 and 4, controls the admission of the compressed air to the passages 93 and 103. Said air valve is actuated by the cam 105 fixed to the gear 34 by the screws 106 and said cam is adjustable on the gear by reason of the arcuate slots 107. The valve is actuated into an open position by contact of the cam 105 with the roller 108 carried by the actuating lever 110. When the valve is open, air under pressure is admitted to the passage 103 to effect a lock-up of the shaft 51 with the reciprocating rack 26. When the valve is closed the compressed air from the passage is automatically exhausted by the conduit connection 102 and the lock-up of the parts is accordingly released. This release of the lock-up mechanism is facilitated by the coil springs 109.

The invention also provides an air actuated brake which becomes operative when the lock-up mechanism is released and as the rack and its components are ending a feeding stroke. Thus the brake should be on at the end of a feeding stroke and should be released before the start of the next feeding stroke. The brake disc 111, FIGURES 3 and 8, is fixed to the left hand end of the shaft 51 by means of the keyed collar 112 and the ring 113 which is secured to the collar by the screws 114. The brake housing 115 is fixed to the side wall 56 by the securing screws 116 and said housing provides a pair of spaced cylinder members 117 which are fixed to the outside of the structure by the screws 119. A pair of similar cylinder members 118 are suitably welded to the inside of the wall 56. A pair of such members are thus located on each side of the brake disc 111. Each member contains a piston 120 which has sealing relation with its cylinder member by an O-ring device 121, and it will be observed that the inner end of each piston is in pressure contact with a metal strip 122. A length of the resilient material 123 having good wearing qualities and good compressive strength is interposed between each metal strip and the brake disc. Also, each metal strip is fixed at its opposite end to the side wall 56 by means of securing bolts 124.

The pistons 120 are pneumatically actuated by air under pressure which is delivered to the flexible conduits 125 to the pistons within member 117 and by the flexible conduits 126 to the pistons within the members 118. When air under pressure is admitted in front of the respective pistons they are forced towards each other and into pressure contact with the metal strips 122. Accordingly, pressure is applied through the resilient material 123 to both sides of the brake disc 111, and in opposing relation. The provision of the metal strips 122 facilitate the braking action. Air under pressure is admitted to both conduits 125 and 126 upon opening action of the air valve 127, FIGURE 4. This valve is similar to valve 104 and it will be observed that the valve is actuated by the cam 105. In FIGURE 4 the cam is rotating counter-clockwise and accordingly the cam is having initial contact with the roller 128 carried by the actuating lever 130 of the valve.

The operations of the present feeding mechanism are diagrammatically illustrated in FIGURE 10 for one feeding cycle. The feeding cycle is considered as starting at zero and following approximately 95 degrees of rotation of the main operating shaft 15 the air valve 104 is actuated to open and the lock-up mechanism is rendered operative. Mid-feeding position is reached following about 15 degrees of rotation and this ends the accelerating portion of the feeding stroke. During deceleration the feed rolls remain locked-up so as to prevent overrun of the feed rolls which, if allowed to take place, would destroy the accuracy of the feeding operation. For about 75 degrees in the decelerating portion of the stroke the disc brake is applied by actuation of the air valve 127. Close to the end of the feeding stroke and at about 8 degrees in advance of the end, the lock-up mechanism is released. It is desirable to release the lock-up mechanism as close to the end of the feeding stroke as possible and, of course, the mechanism must be released before the rack starts its return stroke. However, the brake remains applied and said brake will effectively prevent any overrun of the feed rolls following release of the lock-up mechanism. At some desired point in the return stroke such as following about 82 degrees of rotation from the end of the feeding stroke, the disc brake is released and following the period of rest of the feed rolls, which takes place during the return stroke of the rack, the cycle is repeated.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In a machine of the class described, the combination with a feed roll drive shaft, of driving means having operation to rotate the shaft intermittently, said drive means including an overrunning clutch having an annular outer housing comprising the driving member and an interior hub keyed to the feed roll drive shaft and comprising the driven member of the clutch, lock-up means for releasably locking the hub to the housing, said lock-up means including friction discs carried by the annular outer housing and other friction discs carried by the hub and alternating with the first mentioned friction discs, pneumatic means for applying pressure to the discs to cause the same to frictionally engage and effect the lock-up between the annular outer housing and the hub, the pneumatic means for applying pressure to the friction discs including an air valve, a cam having rotation in timed relation to the feed roll drive shaft and operative to actuate the said air valve, brake means for the feed roll drive shaft including a brake disc fixed to the shaft and pressure actuated means having contact with the brake disc, and a second air valve actuated by said cam for controlling the said pressure actuated means having contact with the brake disc.

2. In a machine of the class described, the combination with a pair of feed rolls, of a feed roll drive shaft, means for driving the shaft intermittently including an over-running clutch having an annular outer housing comprising the driving member and an interior hub keyed to the shaft and comprising the driven member of the clutch, lock-up means for releasably locking the hub to the housing, said lock-up means including a first set of friction discs carried by the annular outer housing and non-rotatably fixed thereto with freedom of axial movement, a second set of friction discs carried by the hub and non-rotatably fixed thereto with freedom of axial movement, said second set of friction discs alternating with those of the first set, a pressure plate mounted on the feed roll drive shaft for axial movement and having sealing contact with the annular outer housing, means for supplying air under pressure to the pressure plate to cause the discs to frictionally engage and effect said lock-up, a friction brake for the feed roll drive shaft, said friction brake comprising a brake disc fixed to the feed roll drive shaft and rotating therewith, a plurality of piston members adapted to engage the face of the brake disc, and pneumatic means for actuating the pistons to cause a frictional braking of the feed roll drive shaft.

3. In a machine of the class as defined by claim 2, additionally including an air valve for controlling the supply of air under pressure to the said means supplying air under pressure to the pressure plate, a cam having rotation in timed relation to the feed roll drive shaft and operative to actuate the said air valve, and a second air valve also actuated by said cam for controlling the admission of air under pressure to the said pneumatic means.

4. In a machine of the class as defined by claim 2, additionally including a strip of suitable material which is fixed at one end and has its other end located between a piston and the brake disc.

References Cited

UNITED STATES PATENTS

| | | | |
|---|---|---|---|
| 2,496,040 | 1/1950 | Criley | 192—12.1 XR |
| 2,656,028 | 10/1953 | Johansen | 192—12.1 XR |
| 2,856,044 | 10/1958 | Koenig et al. | 192—12.1 XR |
| 2,947,537 | 8/1960 | Littell et al. | 226—156 |
| 3,251,442 | 5/1966 | Aschauer. | |

BENJAMIN W. WYCHE III, *Primary Examiner.*

L. J. PAYNE, *Assistant Examiner.*